3,320,030
PRODUCTION OF SULFURYL FLUORIDE
Alfred G. Bisignani, Claymont, Del., and Raymond H.
Edgecomb, Somerville, N.J., assignors to Allied Chemical Corporation, New York, N.Y., a corporation of New York
No Drawing. Filed June 24, 1963, Ser. No. 290,154
10 Claims. (Cl. 23—203)

This invention relates to processes for making sulfuryl fluoride, $SO_2F_2$, and/or sulfuryl chlorofluoride, $SO_2ClF$. Each is a known compound, and each is normally a colorless gas, having respective boiling points of about minus 51° C. and about plus 7° C.

It has been proposed to make sulfuryl fluoride by reaction of elemental fluorine and sulfur dioxide, and by thermal decomposition of $Ba(FSO_3)_2$. Neither procedure has any commercial potentialities. It has also been proposed to make $SO_2F_2$ by reaction of sulfur dioxide, chlorine, and hydrogen fluoride in the presence of a catalyst consisting of activated carbon alone at temperatures of 350–450° C. In this process, at the outset of an operation high yields of good quality $SO_2F_2$ are readily obtainable. However, evidently because of side reactions, the nature of which is not thoroughly understood, the activated carbon catalyst becomes poisoned rapidly, the result being several commercial disadvantages the most important of which are notably short life of the catalyst, low weight recovery of sulfuryl fluoride per weight unit of catalyst used, and rapid dropping off of product yield and quality as poisoning of the activated carbon catalyst progresses. In catalytic operations in which catalyst poisoning is a derogating factor, generally catalyst poisoning is decreased and catalyst longevity increased by lowering reaction temperatures. However, investigatory work in this field, using activated carbon alone as catalyst and substantially lower temperatures of the order of 200–300° C., shows that the expected pattern of poisoning reduction did not follow thru to any degree sufficiently important to afford any notable commercially significant improvements. These lower temperature operations were characterized by substantially the same deficiencies as the higher temperature processes, chiefly, short catalyst life and low $SO_2F_2$ recovery per weight unit of catalyst consumed.

In accordance with the present invention, it has been found that certain activated carbon-alkali metal bifluoride catalysts promote the reaction e.g.

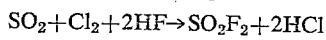

$$SO_2 + Cl_2 + 2HF \rightarrow SO_2F_2 + 2HCl$$

to such extent as to provide improvements in catalyst longevity of the order of fifty to several hundred percent and correspondingly comparable increases in $SO_2F_2$ production per unit of catalyst utilized. Moreover, it has been found that these catalysts not only effect high increase of catalyst longevity and production of $SO_2F_2$ per unit of catalyst, but also make possible accomplishment of such results at temperatures considerably lower than the 350–450° C. temperatures of the prior art. The foregoing and other advantages, afforded by the present discovery of the remarkable catalytic properties of the present activated carbon-alkali metal bifluoride catalysts for promoting reactions directed to production of sulfuryl fluoride and/or sulfuryl chlorofluoride, will be apparent from the following description.

As applied illustratively and preferably to manufacture of sulfuryl fluoride, from procedural standpoint practive of the invention comprises introducing into a reaction zone a substantially anhydrous gaseous mixture comprising and preferably consisting of chlorine, sulfur dioxide, and hydrogen fluoride, passing such mixture thru said zone while in the presence of herein activated carbon-alkali metal bifluoride catalyst material, and while maintaining in the reaction zone reactive temperatures high enough to effect significant reaction but usually not in excess of about 350° C., discharging reaction products from such zone, and recovering $SO_2F_2$ from the reaction zone exit.

Apparatus constituting the reactor and related accessories are simple, and recovery of sought-for product may be in accordance with conventional principles. Reactor and associated equipment, and product recovery system following the reactor may be along the lines described in the appended examples.

The catalysts employed in accordance with the invention are bodies of granular materials preferably consisting of activated carbon and alkali metal bifluoride. Any of the usually commercially available activated carbons may be used. Sizing may be in the range of 2 to 14 mesh. One example of Columbia grade CXC, mesh about 6 to 8, having a packed apparent density of about 0.45. Preferably, a higher density activated carbon is employed, representative example being National Carbon JXC grade of mesh approximately 6 to 8 and having a packed apparent density of about 0.63. In the preferred embodiment the packed apparent density should not be lower than 0.6. The alkali metals include sodium, potassium, lithium, rubidium and caesium, more usually sodium or potassium, and preferably potassium since experience indicates notably better results when potassium bifluoride is used instead of sodium bifluoride.

The catalyst materials may be associated in any suitable way, e.g. as layers in the reactor or as mechanical mixtures in which the alkali metal bifluoride is well dispersed throughout the activated carbon. However, preferred catalysts are those in which the alkali metal bifluoride is impregnated on and carried by the activated carbon. Proportions of activated carbon and alkali metal bifluoride used in making up the catalytic materials are such that the latter contain a major weight proportion of activated carbon, and alkali metal bifluoride in a minor weight proportion not less than about 5% of the weight of a given body of catalytic material. More usually, proportions of activated carbon and alkali metal bifluoride are chosen so that a given catalyst material contains alkali metal bifluoride substantially in the range of 10–40% of the whole, preferred catalytic materials consisting of substantially 10–30% by weight of alkali metal bifluoride, balance being activated carbon. The foregoing relative proportions of activated carbon and alkali metal bifluoride apply regardless of whether the catalytic material is in layer form or a mechanical association or mixture of activated carbon and alkali metal bifluoride, or is in the form of activated carbon impregnated with and acting as a carrier for the bifluoride.

The activated carbon-alkali metal bifluoride impregnated material may be made by conventional known procedures. For example, the quantity of alkali metal bifluoride to be used in making up of a batch of catalyst may be dissolved in water in quantity sufficient to permit thorough mixing of the resulting water solution with the particular quantity of activated carbon to be employed. The water may be evaporated off, and the resulting activated carbon carrying the alkali metal bifluoride may be dried by known procedures to provide the catalytic material preferably consisting of activated carbon and alkali metal bifluoride in the relative quantities desired. To thoroughly dry and otherwise condition the catalysts, the material after having been air dried to a moisture content below about 0.2% and having been charged into a reactor may be purged with e.g. nitrogen at temperature of about 150° C. for an hour or so prior to use.

The catalysts may be made in other ways. For example, activated carbon and the normal alkali metal fluoride may be charged into a reactor, and the normal fluoride converted to the bifluoride in situ in the converter by suitable treatment with HF prior to the initiation of feed to the converter of the chlorine-$SO_2$-HF gas mixture used in the customary practice of the invention process. Should materials fed into a converter contain activated carbon and the normal alkali metal fluoride, content of the latter of the material charged to the converter should be such that on conversion of alkali metal fluoride to the alkali metal bifluoride, the resulting alkali metal bifluoride content falls within the activated carbon-alkali metal bifluoride proportioning described above.

Experience shows that the bifluoride functions to a major extent as a catalyst effecting repetitive consumption and replacement of HF in KF.HF, and not as a major reactant. Practice shows that a bifluoride such as $KHF_2$ is not used up in the reaction since in operations of the type illustrated in the appended examples, the maximum charge of $KHF_2$ would be consumed in about an hour if it were an important source of fluorine for the reaction. Further, in practice of prior processes using activated carbon alone as catalyst, there is adequate evidence to support the conclusion that in some way or other sulfuric acid is formed in the reactor and that such sulfuric acid may be the major cause of poisoning the activated carbon and thus reducing the productive life of the same to potentially below economic requirement. In the invention process, while it is thought that the bifluoride acts chiefly as a fluorine exchange catalyst, it seems possible that the presence of the alkali metal bifluoride in the reactor may result in the formation of an alkali metal sulfate which is much less poisonous to the catalyst than some side reaction products formed in the reactor when activated carbon alone is utilized as catalyst. Whatever the explanation may be, overall results of the use of the herein catalysts are substantial increase in the longevity of the catalyst and increased formation of product per unit of catalyst employed.

In practice of the invention process for making $SO_2F_2$ as the principal sought-for product, reactants ordinarily fed to the reactor are chlorine, sulfur dioxide, and hydrogen fluoride, preferably all substantially anhydrous. While not particularly preferred as starting material, sulfuryl chloride, $SO_2Cl_2$ may be used in place of sulfur dioxide and chlorine, and unless specifically otherwise indicated, $SO_2Cl_2$ is to be considered the equivalent of sulfur dioxide and chlorine.

In customary practice using chlorine, $SO_2$ and HF as starting materials, quantity of chlorine fed in any given operation may be conveniently used as the basis of determination of relative proportioning of chlorine, $SO_2$, and HF reactants and rates of feed of the same. Stoichiometric requirements involve use of one mol each of chlorine and $SO_2$ and two mols of HF. While any reasonably reactive proportions of chlorine, $SO_2$ and HF may be employed, in order to minimize difficulties in the product recovery system which might arise out of the presence of excess chlorine, an appreciable excess of chlorine over theory is not desirable. Hence, in most operations it is preferred, when $SO_2F_2$ is the dominantly sought-for product, to use at least one mol proportion of $SO_2$ and at least two proportions of HF per mol of chlorine. Although larger excesses of $SO_2$ may be employed, ordinarily, a relatively small molecular excess of $SO_2$ is desirable, and preferably $SO_2$ is charged in amount corresponding to about 1.05–1.5 mols per mol of chlorine. With respect to quantity of HF introduced into the reaction, while larger excesses of HF may be used it is preferred to introduce into process HF in amount substantially in the range of 2.05–3.0 mols per mol of chlorine. Incoming chlorine, $SO_2$ and HF may be metered into a mixing manifold, and the resulting mixture charged into the reactor.

Reaction zone temperatures are generally dependent upon whether the dominant sought-for product is sulfuryl fluoride or sulfuryl chlorofluoride. In all embodiments, reaction zone temperatures may be any reasonably elevated reactive temperature above about 100° C. but not appreciably in excess of about 350° C. in order to avoid reduction of catalyst longevity and product yields per unit of catalyst. To minimize possible borderline catalyst poisoning and resulting adverse affects, preferred maximum reaction temperature for all embodiments is about 325° C. In the more desirable operations, i.e. those for making $SO_2F_2$ and with minimized formation of $SO_2ClF$, reaction thresholds substantially at about 150° C., preferred temperature range for making $SO_2F_2$ being substantially 175–325° C.

Another consideration involved in practice of all embodiments is contact time. This element, as in many catalysis processes, is highly variable depending upon such other variable factors as reaction temperature, particular catalyst composition and mesh, sought-for product, type of apparatus, and overall size of a specific operation. When maximum formation of $SO_2F_2$ with minimum formation of $SO_2ClF$ is desirable, contact time is greater than in circumstances where formation of appreciable amount of $SO_2ClF$ as secondary product is desired. For any particular operation with given apparatus equipment, depending upon what the sought-for product may be, determination of major process variables such as optimum reaction temperature and optimum contact time is within the skill of the art, and may be found by test run.

The principles above described for production of the preferred sulfuryl fluoride, with small variations may be applied to effect manufacture of $SO_2ClF$ as the dominant product. Chief procedural changes include reduction in the amount of HF fed, reduction of reaction temperature, and possibly a decrease in contact time. Stoichiometric considerations involve use of half as much HF, i.e. theoretically one mol of HF per mole of each of $SO_2$ and chlorine. What has been noted above with respect to preferred excess of $SO_2$ and HF likewise apply for production of $SO_2ClF$. For manufacture of the latter, reaction zone temperatures may be generally considerably lower than in the case of production of dominantly $SO_2F_2$, temperatures for manufacture of $SO_2ClF$ being generally substantially in the range of 100–250° C., preferably 100–200° C. As in the case of making $SO_2F_2$, when applying the principles of the invention to manufacture of dominantly $SO_2ClF$, determination of optimum temperature and contact times are within the skill of the art, as facilitated by test run. Where the chiefly desired product is $SO_2ClF$, in order to avoid possible loss of the latter by hydrolysis the reactor exit may be introduced directly into a suitable still in which $SO_2FCl$ may be separated and recovered from other constituents of the reactor exit, e.g. chlorine, $SO_2$, HCl, HF and $SO_2F_2$, by fractional distillation.

Although conducive to no particular advantages, reaction zone pressures may be superatmospheric if desired. Usually pressures are substantially atmospheric plus say 2–20 p.s.i.g., i.e. enough to flow the gas stream thru the apparatus train.

The following examples illustrate practice of the invention.

*Example 1.*—In this run, the reactor employed comprised a bundle of 41 tubes, each tube being about 12 feet long and having an I.D. (internal diameter) of about 2 inches. The bundle was mounted in a vertically elongated cylindrical casing providing a gas inlet manifold at the top ends of the tubes and a gas outlet manifold at the bottom ends of the tubes. In turn, the casing was enveloped by a heating chamber associated with other equipment arranged to facilitate maintenance of desired temperatures within the reactor.

The catalyst, made as above described, was activated carbon (activated charcoal, grade National Carbon JXC, packed apparent density about 0.63) impregnated with $KHF_2$ in amount such that the material contained about 17% by weight of $KHF_2$, balance activated carbon. The reactor was charged with about 348 lbs. of total catalyst of which about 59 lbs. was $KHF_2$. Mesh of the material was about 6 to 8.

Feed of a gaseous mixture of $SO_2$, chlorine and HF (all anhydrous) to the gas inlet manifold at the top end of the reactor was adjusted so as to feed to the reaction per hour about 2 (pound) mols of chlorine, 2.1 mols of $SO_2$, and 4.5 mols of HF. During the run, a total of 87 hrs., extraneous heat was applied to the reactor in such manner as to maintain reaction temperatures within the reactor in the range of from about 290° at the upper end of the reactor, to about 190° C. at the bottom or gas outlet end of the reactor.

The reactor exit gas, containing $SO_2F_2$, HF, HCl and smaller amounts of $SO_2FCl$, $SO_2$ and chlorine, was passed thru two series-connected water scrubbers which effected removal from the gas stream of the HF, HCl, $SO_2$, $Cl_2$, and most of the $SO_2FCl$. The gaseous exit of the second water scrubber, containing $SO_2F_2$ and relatively small amounts of $SO_2FCl$ and water, was passed thru a sulfuric acid scrubber to remove most of the moisture, final drying of the gas stream being effected by passing the same thru a bed of activated alumina. The dried gas stream, containing $SO_2F_2$ and a small amount of $SO_2FCl$, was compressed to about 250–425 p.s.i.g., and the compressed gas was charged to a still conveniently operated to facilitate draw-off from the reflux of liquid $SO_2F_2$ product which was immediately packaged in a suitable container. The relatively small amount of $SO_2FCl$, separated from the $SO_2F_2$, collected as still bottoms. During the 87 hour run, the hourly average rate of $SO_2F_2$ production, per 8 hour shift, was a high of about 174 lbs. and a low of 85 lbs. per hour toward the end of the run. Average hourly production for the run overall was about 129 lbs. per hour with total production of about 11,225 lbs. $SO_2F_2$ recovery was about 31.1 lbs. per lb. of catalyst material charged. Utilization of chlorine, $SO_2$ and HF fed to form recovered $SO_2F_2$ product (i.e. yield on the basis of starting material fed) were respectively 63.4%, 60% and 56.4%.

Example 2.—Apparatus employed was the same as in Example 1. In this run, the reactor was charged with about 330 lbs. of fresh catalyst of substantially the same composition as the initial catalyst of Example 1. Feed of chlorine, sulfur dioxide, and HF to the reactor, reactor temperatures throughout the run, and product recovery were substantially the same as in Example 1. During the present run, a total of about 86 hrs., hourly average rate of $SO_2F_2$ production, per 8 hr. shift, varied from a high of about 168 lbs. per hour to a low of about 107 lbs. per hour, average for the run was about 127 lbs. per hour, and total $SO_2F_2$ production was about 10,920 lbs. $SO_2F_2$ production was about 33.1 lbs. per lb. of catalyst charged. Chlorine, $SO_2$ and HF utilizations were about 63%, 59% and 56.4% respectively.

Example 3.—The reactor of the previous examples was charged with about 340 lbs. total of catalyst substantially the same as in previous examples except the catalyst material contained about 23% by weight of $KHF_2$, balance activated carbon. Pound mols per hour feed of chlorine, $SO_2$, and HF were respectively 1.9, 2.0, and 4.8. Throughout the run, covering about 80 hours, temperature in the reactor varied from about 250° C. at the upper end to about 190° C. at the bottom. Hourly average rate of $SO_2F_2$ production, per 8 hour shift was a high of about 130 to a low of about 96 lbs. per hour, and total $SO_2F_2$ production was about 8720 lbs. $SO_2F_2$ production was about 25.6 lbs. per lb. of catalyst charged. Utilization of chlorine, $SO_2$ and HF to form $SO_2F_2$ recovered was about 55.5%, 54.1% and 45.1% respectively.

The following table summarizes other similar operations. Parts are by weight.

| Run No. | Duration of Run Hrs. | Carbon Type | Percent KFHF By Wt. | Total Catalyst, Pts. (Approx.) | Feed Rate Chlorine Pt. Mols | Pts. $SO_2F_2$ Production | Pts. Production Per Pt. of Catalyst |
|---|---|---|---|---|---|---|---|
| 1 | 100.5 | JXC | 17 | 348 | 1–2 | >36,372 | 34.8 |
| 2 | 97 | JXC | 17 | 348 | 2 | | |
| 3 | 81 | JXC | 17 | 348 | 2 | | |
| 4 | 87 | JXC | 17 | 348 | 2 | 11,256 | 32.3 |
| 5 | 57 | CXC | 17 | 240 | 1.75–2 | 5,235 | 21.8 |
| 6 | 70.8 | CXC | 23 | 260 | 2 | 8,630 | 33.2 |
| 7 | 71.5 | CXC | 23 | 260 | 2 | 8,244 | 31.7 |

In Runs 1–4 the activated carbon used in making up the $KHF_2$ impregnated catalyst was the same as employed in above Examples 1–3. In Runs 5–7, the activated carbon constituent was the lower density material previously described. In all of these runs, temperatures were substantially as in Examples 1 and 2.

In a series of 73 tests, using about 270 parts of activated carbon alone as catalyst, temperatures substantially in the range of 190 to 320° C., and other procedural factors about the same as above described, (weight) parts of $SO_2F_2$ made per test run were about 2,470, parts of $SO_2F_2$ made per part of catalyst were about 9.2, and service life of the catalyst for comparative purposes was considered 100%. Corresponding values of Runs 1–3 of the above table were about 12,124 parts, about 34.8 parts, and catalyst life about 490%.

We claim:
1. The process which comprises introducing a substantially anhydrous gaseous mixture comprising chlorine, sulfur dioxide, and hydrogen fluoride into a reaction zone in which there is present a solid catalytic material comprising a major weight proportion of activated carbon and alkali metal bifluoride in a minor weight proportion not less than about 5% of the total catalytic material; maintaining in the reaction zone elevated temperature not substantially in excess of 350° C.; discharging reaction products from said zone and recovering from said products material of the group consisting of $SO_2ClF$ and $SO_2F_2$.

2. The process of claim 1 in which the catalytic material contains substantially 10–40% by weight of alkali metal bifluoride.

3. The process of claim 1 in which temperature is substantially in the range of 100–325° C., and the alkali metal is potassium.

4. The process for making sulfuryl fluoride which comprises introducing a substantially anhydrous gaseous mixture comprising chlorine, at least about one mol proportion of $SO_2$ and at least about two mol proportions of HF per mol of chlorine into a reaction zone in which there is present a solid catalytic material comprising a major weight proportion of activated carbon and alkali metal bifluoride in minor weight proportion not less than about 5% of the total catalytic material; maintaining temperature in said zone substantially in the range of 150–350° C.; discharging reaction products from said zone and recovering $SO_2F_2$ from said products.

5. The process of claim 4 in which temperature is substantially in the range of 175–325° C.

6. The process of claim 4 in which the catalytic material contains substantially 10–40% by weight of alkali metal bifluoride.

7. The process of claim 4 in which the alkali metal is potassium.

8. The process for making sulfuryl fluoride which comprises introducing a substantially anhydrous gaseous mixture comprising chlorine, more than one mol proportion of $SO_2$ and more than two mol proportions of HF per mol of chlorine into a reaction zone in which there is present a solid catalytic material comprising activated carbon having impregnated therein alkali metal bifluoride in amount substantially 10–30% by weight of the total carbon-bifluoride catalytic material; maintaining temperature in said zone substantially in the range of 175–325° C.; discharging reaction products from said zone and recovering $SO_2F_2$ from said products.

9. The process of claim 8 in which the alkali metal is potassium.

10. The process of claim 8 in which the activated carbon has a packed apparent density value not lower than 0.6.

References Cited by the Examiner

UNITED STATES PATENTS

| | | | |
|---|---|---|---|
| 1,685,759 | 9/1928 | Walter | 23—203 X |
| 2,377,217 | 5/1945 | Dvornikoff et al. | 23—203 |
| 2,562,432 | 7/1951 | McCann et al. | 23—14 |
| 2,772,144 | 11/1956 | Belf | 23—203 |
| 3,092,458 | 6/1963 | Ruh et al. | 23—203 |

FOREIGN PATENTS 419,521  10/1925  Germany.

OTHER REFERENCES

Woyski: Article entitled "The Fluorination of Sulfuryl Chloride," American Chemical Society Journal, volume 72 (Jan.–Apr. 1950), pages 919–921.

OSCAR R. VERTIZ, *Primary Examiner.*

B. H. LEVENSON, *Assistant Examiner.*